United States Patent
Yabushita et al.

(10) Patent No.: US 8,751,089 B2
(45) Date of Patent: Jun. 10, 2014

(54) TRAJECTORY TRACKING CONTROL SYSTEM AND METHOD FOR MOBILE UNIT

(75) Inventors: Hidenori Yabushita, Toyota (JP); Kazuhiro Mima, Toyota (JP); Takemitsu Mori, Toyota (JP); Yoshiaki Asahara, Obu (JP)

(73) Assignee: Toyota Jidosah Kabushki Kaisha, Toyota-shi, Aichi-ken (JP)

( * ) Notice: Subject to any disclaimer, the term of this patent is extended or adjusted under 35 U.S.C. 154(b) by 1289 days.

(21) Appl. No.: 12/282,998

(22) PCT Filed: Mar. 9, 2007

(86) PCT No.: PCT/IB2007/000611
§ 371 (c)(1),
(2), (4) Date: Sep. 15, 2008

(87) PCT Pub. No.: WO2007/105077
PCT Pub. Date: Sep. 20, 2007

(65) Prior Publication Data
US 2009/0099717 A1 Apr. 16, 2009

(30) Foreign Application Priority Data
Mar. 14, 2006 (JP) ................. 2006-069171

(51) Int. Cl.
*G01C 22/00* (2006.01)
*G05D 1/00* (2006.01)
*G06F 19/00* (2011.01)
*G05D 1/02* (2006.01)
*B60T 8/172* (2006.01)
*G06N 3/00* (2006.01)

(52) U.S. Cl.
CPC .............. *G05D 1/0272* (2013.01); *B60T 8/172* (2013.01); *G06N 3/008* (2013.01)
USPC ................................. 701/23; 701/1; 700/245

(58) Field of Classification Search
None
See application file for complete search history.

(56) References Cited

U.S. PATENT DOCUMENTS

| | | | | |
|---|---|---|---|---|
| 4,912,753 A | * | 3/1990 | Evans, Jr. | 700/245 |
| 5,465,037 A | * | 11/1995 | Huissoon et al. | 318/568.11 |
| 5,732,195 A | * | 3/1998 | Nakata et al. | 700/260 |
| 6,134,486 A | | 10/2000 | Kanayama | |

FOREIGN PATENT DOCUMENTS

| | | |
|---|---|---|
| DE | 39 12 353 | 11/1989 |
| JP | 2002-215239 | 7/2002 |

* cited by examiner

*Primary Examiner* — Ryan Zeender
*Assistant Examiner* — Denisse Ortiz Roman
(74) *Attorney, Agent, or Firm* — Finnegan, Henderson, Farabow, Garrett & Dunner, LLP

(57) ABSTRACT

A trajectory tracking control system according to the invention controls a robot (1) to track a target path (100). In this system, the target path (100) is approximated to an arc, and the curvature of the arc is calculated. At this time, the curvature is calculated in accordance with the moving speed of the robot (1). Then, the control of the robot (1) is set in accordance with the calculated curvature.

18 Claims, 7 Drawing Sheets

TRAJECTORY TRACKING CONTROL SYSTEM AND METHOD FOR MOBILE UNIT

CROSS-REFERENCE TO RELATED APPLICATIONS

This application is a national phase application of International Application No. PCT/IB2007/000611, filed Mar. 9, 2007, and claims the priority of Japanese Application No. 2006-069171, filed Mar. 14, 2006, the contents of both of which are incorporated herein by reference.

BACKGROUND OF THE INVENTION

1. Field of the Invention

The invention relates to a trajectory tracking control system and method for a mobile unit, and in particular to a system and method for controlling trajectory tracking of a robot.

2. Description of the Related Art

A technology has been proposed, which controls a mobile unit, such as a vehicle and a robot, to track a target path automatically. For example, there is a technology that performs automatic trajectory tracking of a mobile unit by performing feed-back control on the amount by which the position of the mobile unit deviates in the lateral direction and the amount of deviation of azimuth angle of the mobile unit. However, when only such feed-back control is performed, the response of the mobile unit to changes in the curvature may be delayed, and therefore it is difficult for the mobile unit to track a target path including curves having various curvatures.

To solve this problem, JP-A-2002-215239 proposes a technology in which the steering angle of a mobile unit is determined based on the operation amount that is set by feed-forward control on the curvatures of a target path and the positional deviation of the mobile unit in the lateral direction, as well as the operation amount that is set by feed-back control on the positional deviation of the mobile unit in the lateral direction and the deviation of azimuth angle relative to the target path. According to this technology, the mobile unit can accurately track a target path having various curvatures.

However, according to the tracking control technology described in JP-A-20020215239, the curvature of the target path is directly put into the control loop, and therefore the behavior of the mobile unit directly reflects discontinuous changes in the curvature of the target path, and as a result, the motion of the mobile unit becomes unstable. In addition, because the mobile unit is always subjected to the free-forward control, when the mobile unit largely deviates from the target path, the operation amounts provided by the feed-forward control act as disturbances to the operation amounts provided by the feed-back control, and as a result, the accuracy of the trajectory tracking deteriorates.

SUMMARY OF THE INVENTION

It is an object of the invention to provide a trajectory tracking control system and method that enable a mobile unit to track a target path accurately.

A first aspect of the invention relates to a trajectory tracking control system that controls a mobile unit to track a target path. The trajectory tracking control system includes: a curvature calculating portion that approximates the target path to an arc and calculates a curvature of the arc; and a feed-forward control portion that sets a feed-forward control of the mobile unit in accordance with the curvature calculated by the curvature calculating portion. The curvature calculating portion calculates the curvature in accordance with the moving speed of the mobile unit. According to this structure, the mobile unit can accurately track the target path.

In the trajectory tracking control system described above, for example, the curvature calculating portion may calculate the curvature in accordance with the moving speed and the control cycle of the mobile unit. In particular, calculating the curvature in accordance with the control cycle enables the mobile unit to be controlled by a unit of control amount that is applicable to the actual operation of the mobile unit, and thus improves the accuracy of the tracking motion of the mobile unit.

Further, in the trajectory tracking control system described above, the curvature calculating portion may include: a closest point setting portion that sets, on the target path, a point that is closest to the mobile unit; an adjacent point setting portion that sets, on the target path, an adjacent point before the closest point set by the closest point setting portion and an adjacent point after the closest point set by the closest point setting portion; and an arc setting portion that sets an arc that extends through the closest point set by the closest point setting portion and the adjacent points set by the adjacent point setting portion. According to this structure, the calculation of the curvature can be simplified.

In the structure described above, the adjacent point setting portion may determine the distance between the closest point and each of the adjacent points in accordance with the moving speed of the mobile unit. In this case, the mobile unit can be controlled to track the target path in a manner suitable for the moving speed thereof.

Also, the adjacent point setting portion may set the distance between the closest point and each of the adjacent points in accordance with the moving speed and the control cycle of the mobile unit. In this case, in particular, determining the distance between the closest point and each of the adjacent points in accordance with the control cycle enables the mobile unit to be controlled by a unit of control amount that is applicable to the actual operation of the mobile unit, and thus improves the accuracy of the tracking motion of the mobile unit.

For example, the adjacent point setting portion may determine a distance L between the closest point and each of the adjacent points in accordance with $V\Delta T$ where V is the moving speed of the mobile unit and $\Delta T$ is the control cycle of the mobile unit.

Further, the feed-forward control portion may stop the feed-forward control when at least one of the amount of a position error of the mobile unit with respect to the target path and the amount of an orientation error of the mobile unit with respect to the target path is larger than a predetermined amount. According to this structure, the accuracy of the trajectory tracking improves. Meanwhile, one of preferred examples of the mobile unit is a robot.

A second aspect of the invention relates to a trajectory tracking control method for controlling a mobile unit to the track a target path. This method includes; a step of approximating the target path to an arc; a step of calculating a curvature of the arc in accordance with a moving speed of the mobile unit; and a step of setting a control of the mobile unit in accordance with the calculated curvature. In the step of calculating the curvature, the curvature is calculated in accordance with the moving speed of the mobile unit. According to this method, the mobile unit can accurately track the target path.

In the trajectory tracking control method described above, the curvature may be calculated in accordance with the moving speed and the control cycle of the mobile unit. In this case, in particular, calculating the curvature in accordance with the control cycle enables the mobile unit to be controlled by a unit of control amount that is applicable to the actual operation of the mobile unit, and therefore the accuracy of the tracking motion of the mobile unit improves.

The step of calculating the curvature may include a step of setting, on the target path, a point that is closest to the mobile unit; a step of setting, on the target path, an adjacent point before the closest point and an adjacent point after the closest point; and a step of setting an arc that extends through the closest point and the adjacent points. These steps simplify the calculation of the curvature.

In the method described above, the distance between the closest point and each of the adjacent points may be determined in accordance with the moving speed of the mobile unit. In this case, the mobile unit can be controlled to track the target path in a manner suitable for the moving speed thereof.

Also, the distance between the closest point and each of the adjacent points may be determined in accordance with the moving speed and the control cycle of the mobile unit. In this case, in particular, determining the distance between the closest point and each of the adjacent points in accordance with the control cycle enables the mobile unit to be controlled by a unit of control amount that is applicable to the actual operation of the mobile unit, and therefore the accuracy of the tracking motion of the mobile unit improves.

For example, a distance L between the closest point and each of the adjacent points may be determined in accordance with $V\Delta T$ where V is the moving speed of the mobile unit and $\Delta T$ is the control cycle of the mobile unit.

Further, the control of the mobile unit that is set in accordance with the curvature may be stopped when at least one of the amount of a position error of the mobile unit with respect to the target path and the amount of an orientation error of the mobile unit with respect to the target path is larger than a predetermined amount. According to this method, the accuracy of the trajectory tracking improves. Meanwhile, one of preferred examples of the mobile unit is a robot.

A third aspect of the invention relates to a trajectory tracking control program for controlling a mobile unit to track a target path. The trajectory tracking control program includes: an instruction for causing a computer to execute a step of approximating the target path to an arc and calculating a curvature of the arc; and an instruction for causing the computer to execute a step of setting a control of the mobile unit in accordance with the calculated curvature. According to this program, the mobile unit can accurately track the target path.

As described above, the trajectory tracking control system, method and program according to the respective aspects of the invention enable the mobile unit to track the target path accurately.

BRIEF DESCRIPTION OF THE DRAWINGS

The foregoing and further objects, features and advantages of the invention will become apparent from the tracking description of preferred embodiments with reference to the accompanying drawings, wherein like numerals are used to represent like elements and wherein.

DETAILED DESCRIPTION OF EXEMPLARY EMBODIMENTS

A trajectory tracking control system according to this exemplary embodiment of the invention is configured to control the trajectory tracking of a robot as a mobile unit. This trajectory tracking control system is constituted by, for example, a computer mounted in the robot or a computer that is provided separately from the robot. The computer includes, for example, a CPU (Central Processing Unit), a ROM (Read Only Memory), a RAM (Random Access Memory), a sub-recording device (e.g., hard drive), a transportable recording device into which a transportable recording medium is inserted (e.g., CD-ROM drive), an input portion, and an output portion. Application programs are stored in the ROM, the sub-recording device, and the transportable recording device, and each of the application programs, when executed, is loaded into the RAM and cooperates with the operating system to provide various commands to the CPU, and so on. The application programs include a specific computer program for realizing the trajectory tracking control system of this exemplary embodiment. When the tracking control is performed by the trajectory tracking control system, the application program is loaded into the RAM and the processes of the application program are then executed while reading out various data stored in the sub-recording device and recording various data into the same device.

Figure 1:
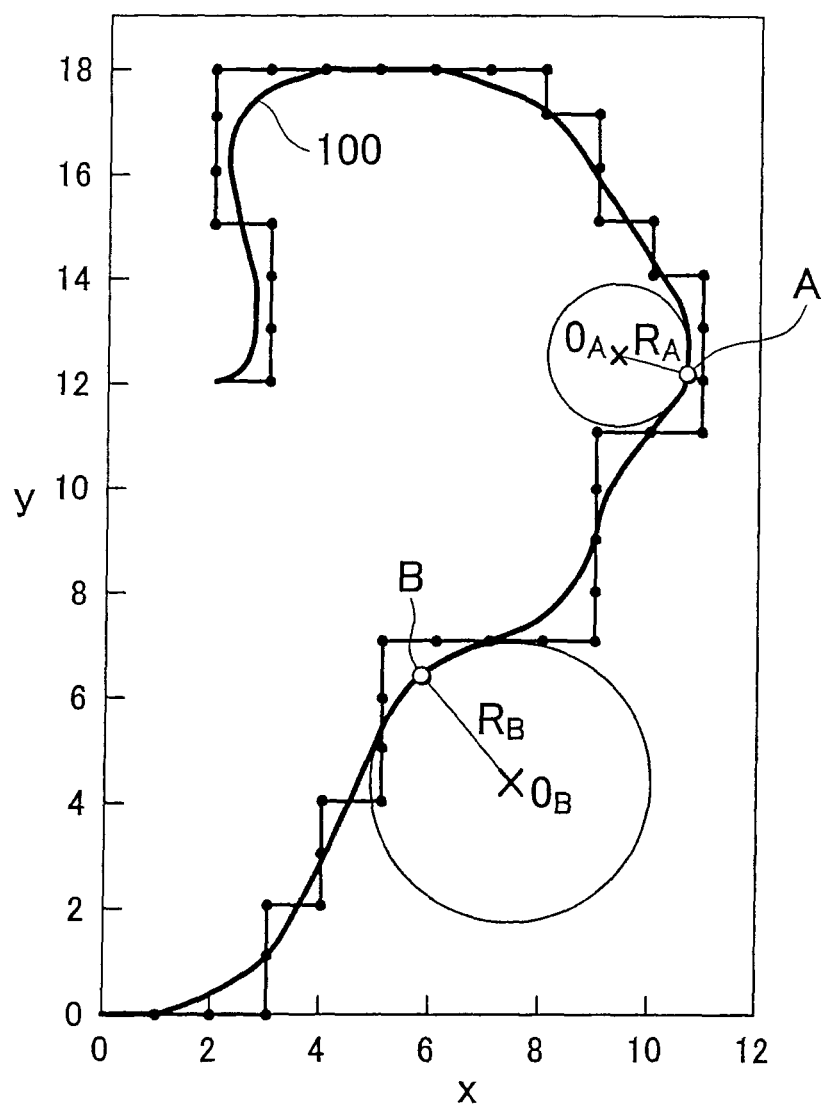
FIG. 1 is a diagram showing a grid coordinate system representing the moving path of a robot that is controlled by a trajectory tracking control system according to an exemplary embodiment of the invention and a target path for the robot.

A target path that is a target trajectory of the robot is often defined as a set of coordinates, and the coordinates are plotted in a grid coordinate system, as shown in FIG. 1, in which discrete coordinates are arranged in a grid format. The advantage of using a grid coordinate system is that the shortest path can be easily searched and a reliable path to the destination can be searched. However, a target path defined by such a gird coordinate system is a path that consists of straight lines connected to each other and therefore is not smooth, so it is difficult for robots to track the target path. To cope with this, a curved path, as a smooth path that can be tracked by robots, may be obtained by, for example, applying a curve approximation method, or the like, to discrete path coordinates that have been determined.

Figure 2:
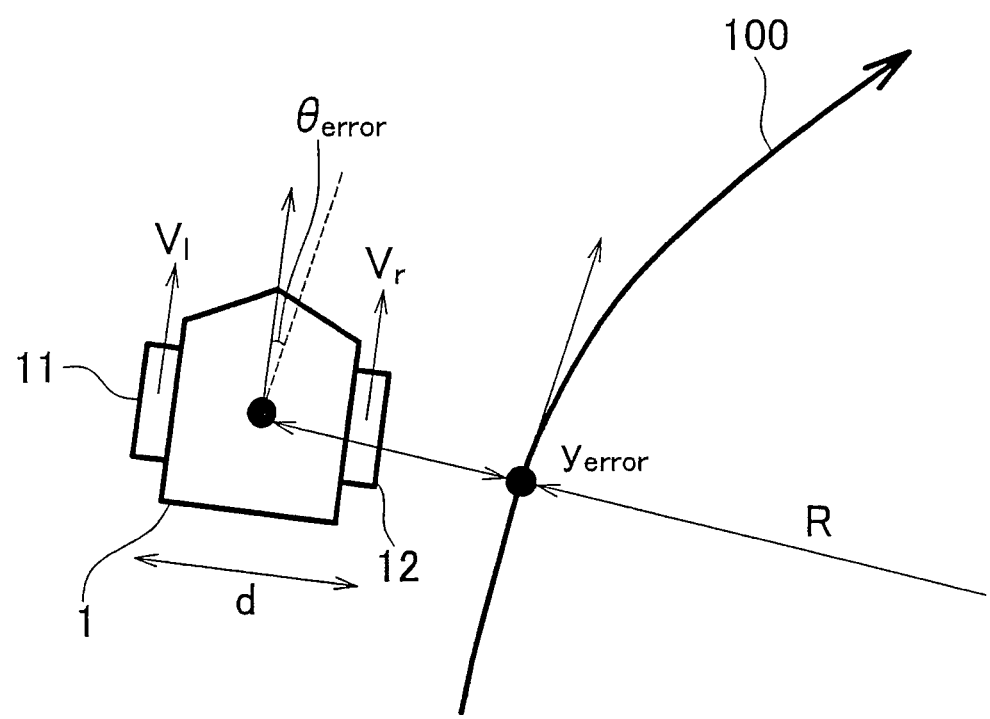
FIG. 2 is a view illustrating the geometrical relations among the control parameters that are used by the trajectory tracking control system according to the exemplary embodiment of the invention.

Indicated by the solid line in FIG. 1 is a target path 100 that is described by free-form curves. Hereafter, description will be made of the case in which a robot 1 that is configured as shown in FIG. 2 tracks the target path 100. The robot 1 has two wheels 11, 12, and the rotation speed of each wheel 11, 12 is controlled by an actuator, such as a motor.

Regarding the robot 1, the control law expressed by the tracking equations is established.

$$V_l = \left\{\left(1 - \frac{d}{2R}\right) + (k_y y_{error} + k_\theta \theta_{error})\right\}V \quad \text{Equation (1)}$$

$$V_r = \left\{\left(1 + \frac{d}{2R}\right) - (k_y y_{error} + k_\theta \theta_{error})\right\}V$$

where:

$V_l$ is the moving speed of the left wheel 11;
$V_r$ is the moving speed of the right wheel 12;
V is the tangential velocity of the robot 1 (carriage);
d is the distance between the left wheel 11 and the right wheel 12;
R is the curvature radius to the closest point;
$y_{error}$ is the position error with respect to the target path;
$\theta_{error}$ is the orientation error with respect to the target path;
$k_y$ is a feed-back gain from the position error; and
$k_\theta$ is a feed-back gain from the orientation error.

In the above equations, "1−(d/2R)" and "1+(d/R)" are feed-forward terms, and "$k_y y_{error} + k_\theta \theta_{error}$" are feed-back terms. The feed-forward terms are used in controlling the wheels 11, 12 of the robot 1 so that the robot 1 tracks a curve that is estimated on the assumption that the robot 1 turns so as to draw a curve having a particular curvature, and the feed-back terms are used in controlling the robot 1 so as to eliminate the position and orientation errors with respect to the target path.

The circles shown in FIG. 1 have curvature radiuses $R_A$, $R_B$ and curvature centers $O_A$, $O_B$ at the arbitrary points A, B on the target path, respectively. The curvature radiuses $R_A$, $R_B$ are used in the equations (1) for the trajectory tracking control of the robot 1.

Next, the flow of the trajectory tracking control in this exemplary embodiment of the invention will be described using the flowchart shown in FIG. 3. To begin with, the point on the target path that is closest to the robot 1 is searched (S101). Although this search of the closest point can be performed by various methods, this exemplary embodiment uses a splitting method.

Figure 4:
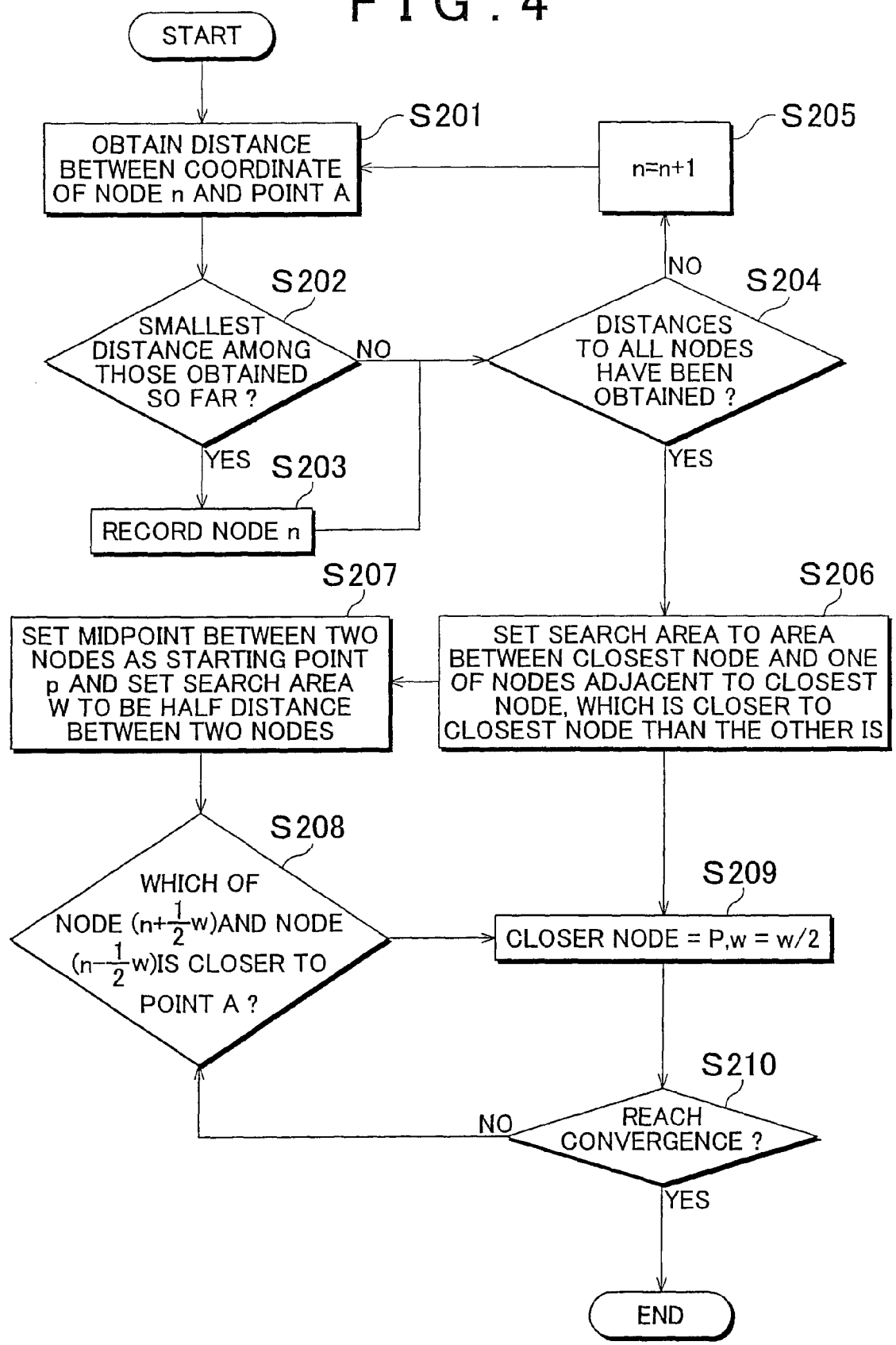
FIG. 4 is a flowchart showing the flow of processes that are executed by the trajectory tracking control system according to the exemplary embodiment of the invention.
Figure 5:
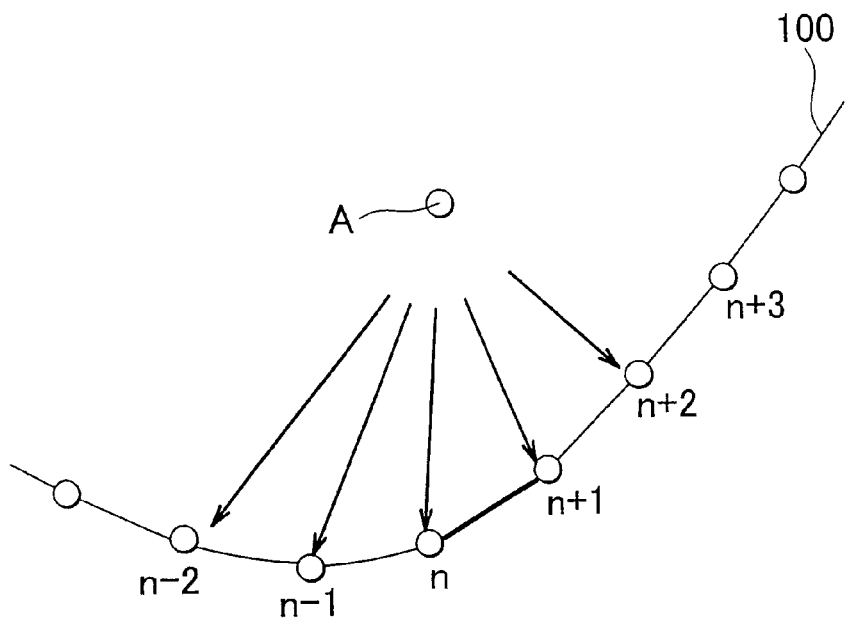
FIG. 5 is a view illustrating the searching of the closest point that is performed by the trajectory tracking control system according to the exemplary embodiment of the invention.
Figure 6:
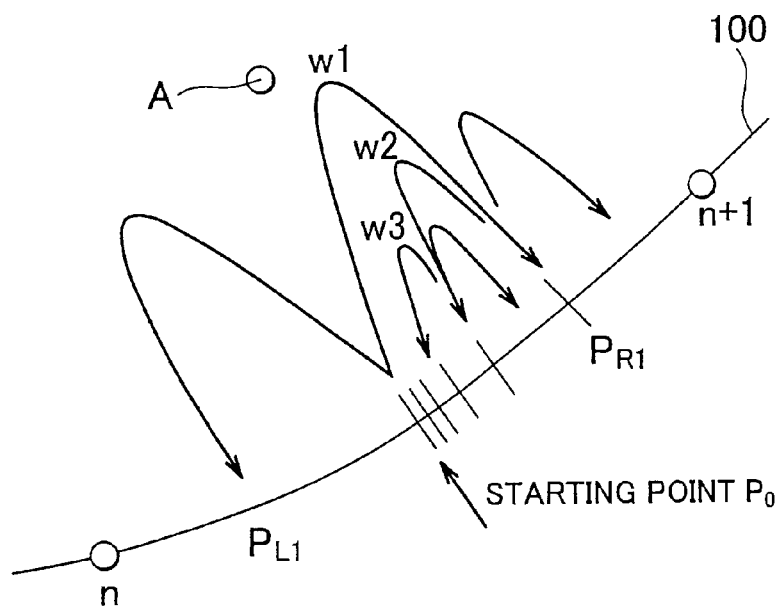
FIG. 6 is a view illustrating the searching of the closest point that is performed by the trajectory tracking control system according to the exemplary embodiment of the invention.

The search of the closest point will be illustrated in detail in FIG. 4, FIG. 5, and FIG. 6. Referring to FIG. 5, in the case where the closest point on the target path 100 is searched when the robot 1 is at the point A, the distance between the coordinate of the node n and the point A is obtained (S201). Then, it is determined whether the obtained distance is the shortest among the distances between the point A and the coordinates of the respective nodes, which have been obtained so far (S202). If it is determined in S202 that the obtained distance to the node n is the shortest, the node n is recorded (S203). On the other hand, if it is determined in S202 that the obtained distance to the node n is not the shortest, or after the node n is recorded in S203, it is then determined whether the distances to all the nodes have already been obtained (S204).

If it is determined in S204 that the distances to all the nodes have not yet been obtained, S201 is then performed for the node n+1. Then, if it is determined in S204 that the distances to the all the nodes have already been obtained, one of the two nodes (adjacent nodes) adjacent to the node closest to the robot 1 (closest node), which is closer to the closest node than the other is, is set as the adjacent node, and a search area is set to the area between the closest node and the adjacent node (S206). Then, as shown in FIG. 6, the midpoint between these two nodes defining the search area is set as a starting point $P_0$ and the search area is set to a search area w1 that extends half the distance L between the node n and the node n+1(S207), with respect to the starting point $P_0$, as the center thereof. In the example shown in FIG. 6, the search area w1 is set to the area between a point $P_{L1}$ that is (½)w1 away from, i.e., (¼)L away from the starting point $P_0$ on the node n side and a point $P_{R1}$ that is (½)w1 away from, i.e., (¼)L away from the starting point $P_0$ on the node n+1 side. Then, with regard to the starting point $P_0$, it is determined which of the node $P_{L1}$ that is n−(½)w1 and the node $P_{R1}$ that is n+(½)w1 is closer to the point A (S208). Next, the node that has been determined to be the node closer to the point A in S208 is set as a proximal point P, and the search area is then set to a search area w2 that extends half the length of the area w1, with respect to the proximal point P, as the center thereof (S209), and S208 is performed with the newly set search area w2, after which the same process is repeated. When this process reaches convergence, the proximal point P that is determined, at this time, to be the node closest to the point A is set to the closest point and its coordinate is obtained.

Figure 3:
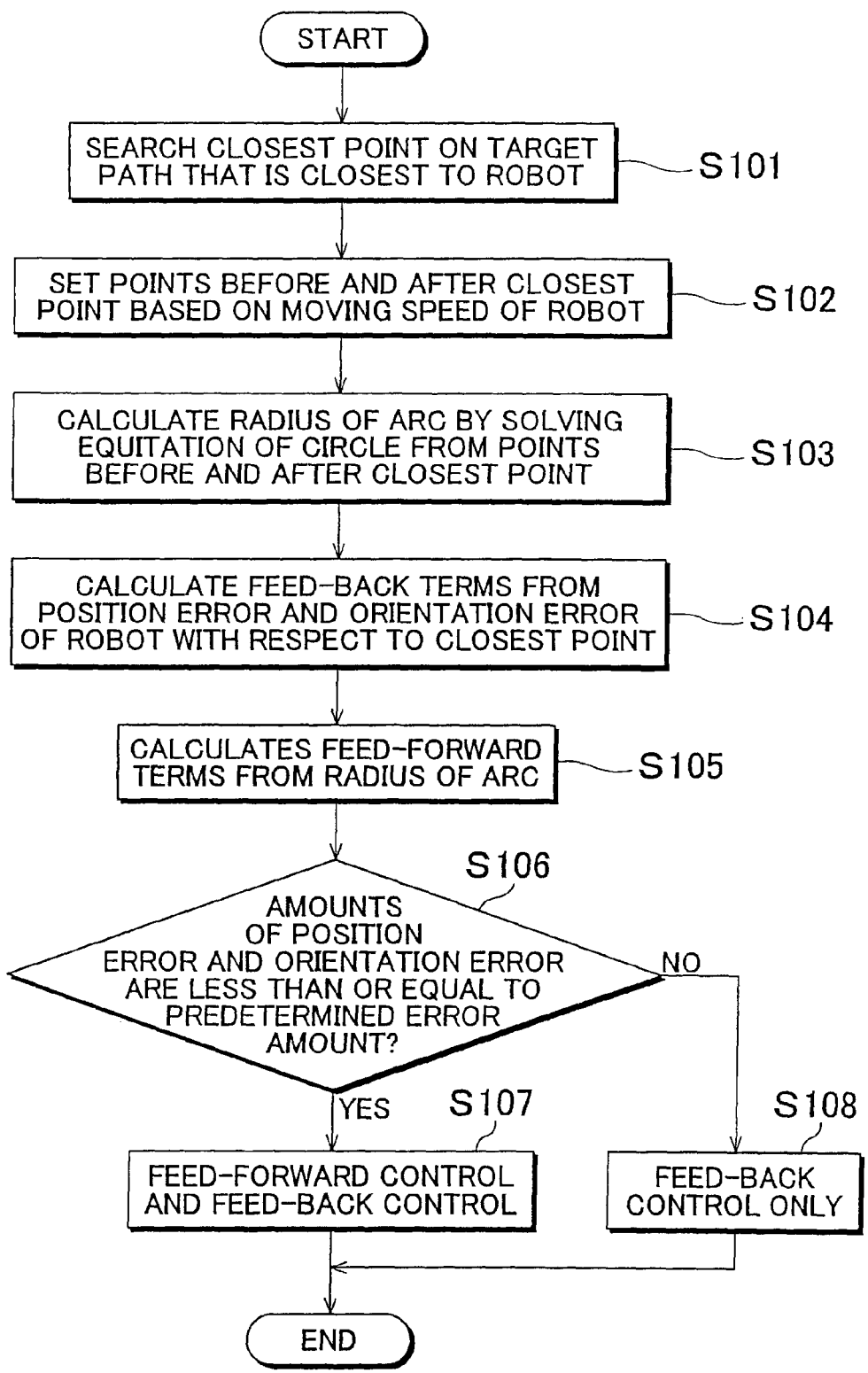
FIG. 3 is a flowchart showing the flow of processes that are executed by the trajectory tracking control system according to the exemplary embodiment of the invention.
Figure 7:
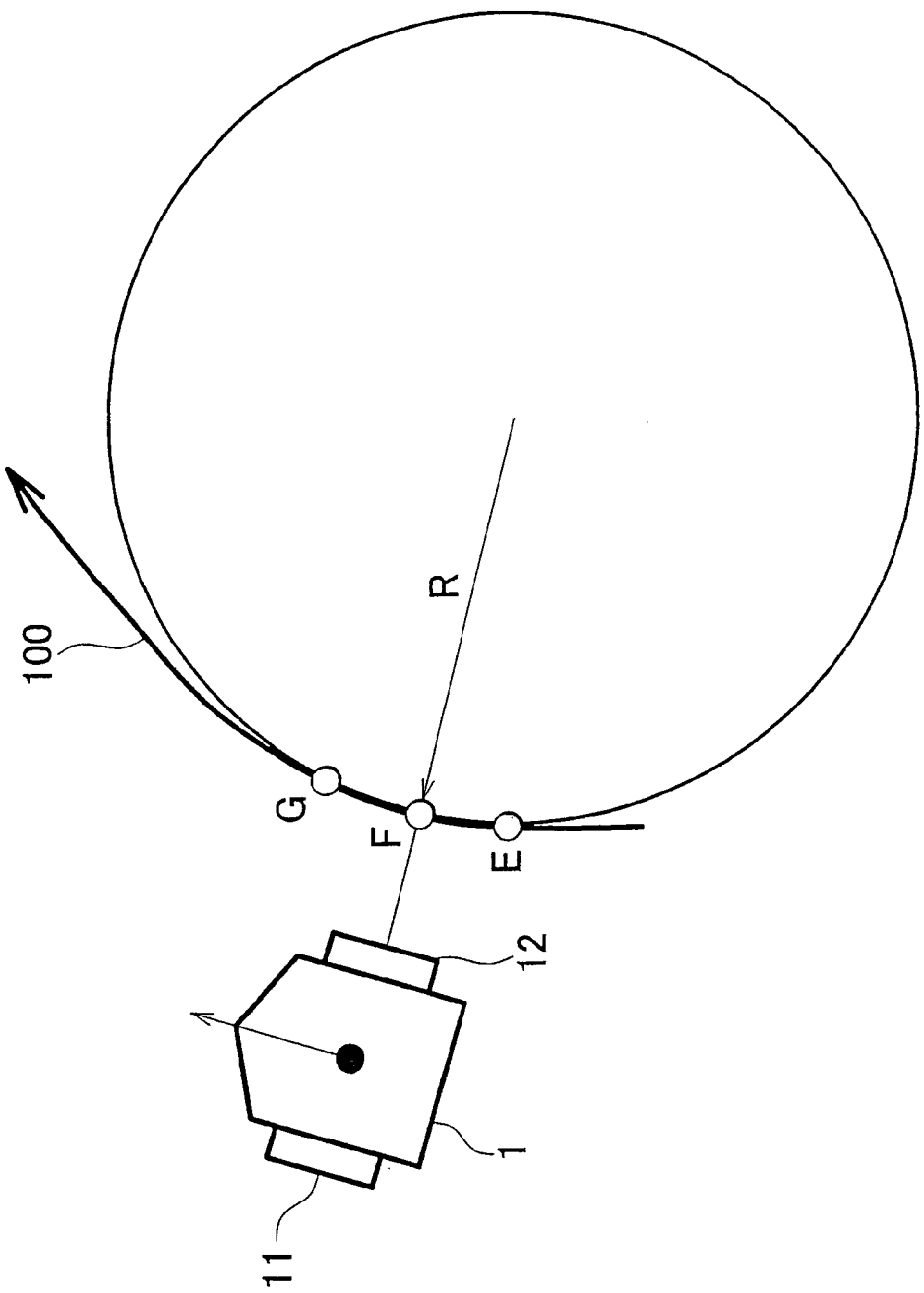
FIG. 7 is a view illustrating the arc approximation that is performed by the trajectory tracking control system according to the exemplary embodiment of the invention.

Back to the flowchart shown in FIG. 3, after the closest point has been determined as described above, points before and after the closest point are set based on the moving speed of the robot 1 (S102). When the closest point is the point F in FIG. 7, the points E, G that are located after and before the point F on the target path, respectively, are set.

The distance between the point E and the point F and the distance between the point F and the point G are equal to each other, and this distance L is obtained as L=VΔT where V is the moving speed of the robot 1 and ΔT is the control cycle. That is, the distance L is directly proportional to the moving speed V and the control cycle ΔT. When the points E, F, and G have been thus set, it is possible to uniquely identify the circle extending through these three points.

Next, the radius R of the arc is calculated by solving the equitation of the circle using the points E, F, and G, i.e., the closest point, and the points before and after the closest point (S103). The equation of the circle is as tracks.

$$x^2 + y^2 + ax + by + c = 0 \quad \text{Equation (2)}$$

If the coordinates of the points E, F, and G are $E(x_0, y_0)$, $F(x_1, y_1)$, and $G(x_2, y_2)$, respectively, the tracking simultaneous equation (3) is obtained using these coordinates.

$$\begin{bmatrix} x_0 & y_0 & 1 \\ x_1 & y_1 & 1 \\ x_2 & y_2 & 1 \end{bmatrix} \begin{bmatrix} a \\ b \\ c \end{bmatrix} = -\begin{bmatrix} x_0^2 + y_0^2 \\ x_1^2 + y_1^2 \\ x_2^2 + y_2^2 \end{bmatrix} \quad \text{Equation (3)}$$

In the equation (3) indicated above, the unknowns a, b, and c are calculated by solving the inverse matrix in the left side of the equation using an arithmetic method, such as the lower and upper triangular matrix decomposition. Then, using the calculated unknowns a, b, and c, the curvature and the curvature center O $(x_0, y_0)$ with respect to the point A are obtained as tracks.

$$R = \{(a^2 + b^2)/4 - c^2\}^{1/2}$$

$$x_0 = a/2$$

$$y_0 = b/2$$

Next, the feed-back terms in the equation (1) are calculated using the position error and the orientation error of the robot 1 with respect to the closest point F (S104).

Then, the feed-forward terms in the equation (1) are calculated using the radius R of the arc, which has been calculated in S103 (S105).

Then, it is determined whether the amount of each of the position error and the orientation error is less than or equal to a predetermined error amount (S106). If it is determined that the amount of each error is less than or equal to the predetermined error amount, the feed-forward control and the feed-back control are both executed (S107). That is, the moving speeds of the left and right wheels 11, 12 are determined using the values of the feed-back terms that have been calculated in S104 and the values of the feed-forward terms that have been calculated in S105, and the control is then performed in accordance with the determined moving speeds of the left and right wheels 11, 12.

On the other hand, if it is determined in S106 that either or both of the amount of the position error and the amount of the orientation error exceed the predetermined error amount, only the feed-back control is performed (S108), that is, the feed-forward control is not performed. At this time, the moving speeds of the left and right wheels 11, 12 are determined using only the values of the feed-back terms that have been calculated in S104, and the control is then performed in accordance with the determined moving speeds of the left and right wheels 11, 12.

Figure 8:
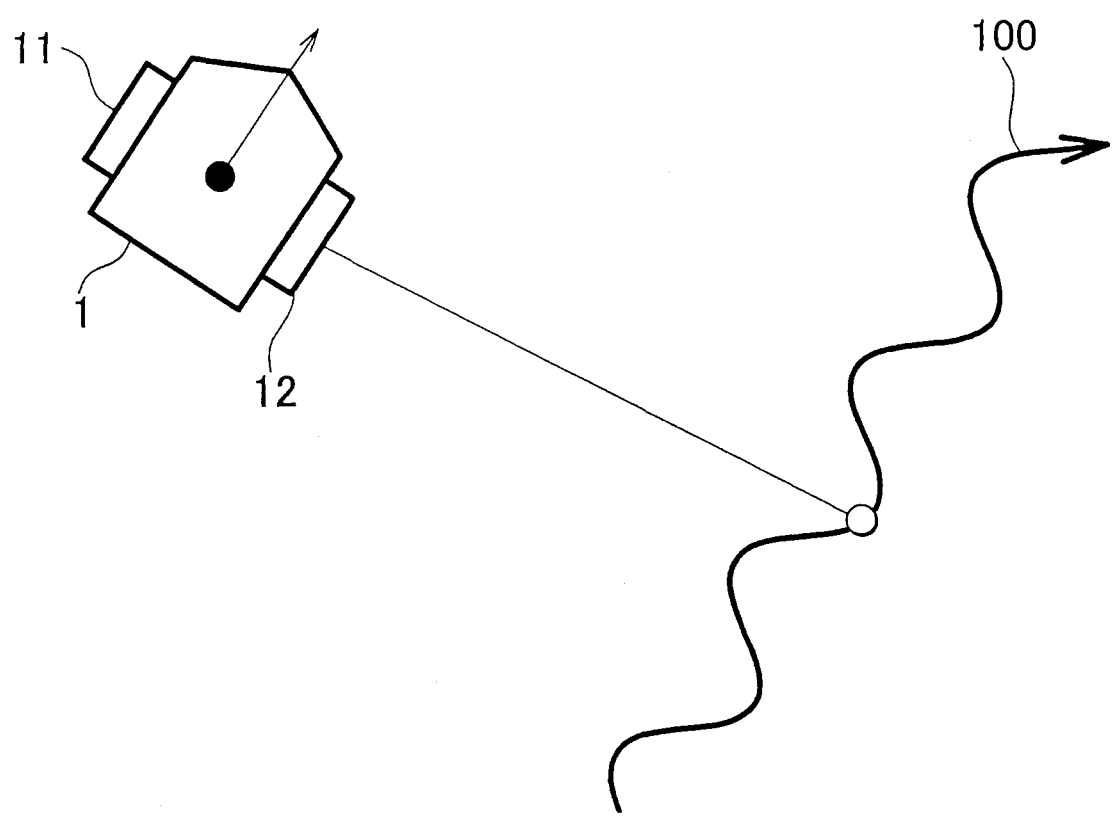
FIG. 8 is a view illustrating the processes that are executed by the trajectory tracking control system according to the exemplary embodiment of the invention.

As described above, in this exemplary embodiment, execution of the feed-forward control is limited to the states where the amounts of the errors in the trajectory tracking of the robot 1 are less than or equal to the predetermined error amounts. In the case where the distance between the robot 1 and the target path is large as in the example shown in FIG. 8, if the feed-forward control is executed to the robot 1, the calculations are performed on the assumption that the robot is moving on the target path, and therefore the inputs from the feed-forward control disturb the feed-back control that corrects the errors in the trajectory tracking of the robot 1, and as a result, the accuracy of the trajectory tracking deteriorates. To counter this, in this exemplary embodiment, when the distance between the target path and the robot 1 is large, that is, when the amount of the error in the trajectory tracking is greater than the predetermined error amount, only the feed-back control is performed to control the trajectory tracking of the robot 1, that is, the feed-forward control is not performed. For example, when the robot is moving in the direction opposite to the target direction, the feed-forward control is stopped.

Also, in this exemplary embodiment of the invention, in the arc approximation of the target path, each curvature radius of the target path is set in accordance with the moving speed of the robot 1, such that the curvature radius increases as the moving speed of the robot 1 increases, and such that the curvature radius decreases as the moving speed of the robot 1 decreases. More specifically, in the exemplary embodiment, the target path is determined such that, when the robot 1 is moving at a high speed, the robot 1 gently turns at a point where small units of the target path direct the robot 1 to turn sharply, and when the robot 1 is moving at a low speed, the robot 1 sharply turns at the point as directed by the small units of the target path. In this manner, the robot 1 is controlled to track the target path accurately.

In this exemplary embodiment, the distance between the closest point and each point adjacent to the closest point is determined as $L=V\Delta T$. In this case, the value obtained by multiplying the moving speed V of the robot 1 with the control cycle $\Delta T$ represents the time period during which the moving direction and the moving speed of the robot 1 can not be changed according to the control cycle $\Delta T$, and therefore the value corresponds to the distance over which the moving direction and the moving speed of the robot 1 can not be changed. Thus, if the target path is approximated to an arc using a unit that is shorter than the above distance over which the moving direction and the moving speed of the robot 1 can not be changed, it is impossible to control the movement of the robot 1 as directed by such small units of the target path. However, when the distance between the closest point and each point adjacent thereto is determined as $L=V\Delta T$ as described above, the robot 1 is not affected by changes in the curvature of the target path that occur within a time period shorter than the control cycle of the robot 1, and therefore the trajectory tracking control of the robot 1 can be accurately performed.

While the distance between the closest point and each point adjacent thereto is determined as $L=V\Delta T$ in the exemplary embodiment described above, it is sufficient to set the same distance to be greater than $L=V\Delta T$. For example, it may be determined by a general expression, such as $L=aV\Delta T+b$ (a, b=constants).

Other Exemplary Embodiments

While a trajectory tracking control system according to the invention is applied to a robot having two wheels in the exemplary embodiment described above, it may alternatively be applied to, for example, a robot having four wheels, a robot having a single wheel, a robot having two legs, a robot having four legs, etc. In the case of a walking robot, the robot can be controlled to track the target path by changing the moving direction by controlling each stride of the robot. Also, the invention may be applied to various vehicles, such as two-wheel vehicles and four-wheel vehicles, as well as robots.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A trajectory tracking control system that controls a mobile unit to track a target path described by free-form curves, comprising:
   a mobile unit; a curvature calculating portion that calculates an arc which approximates to the target path, the curvature calculating portion calculating a curvature of the arc in accordance with a moving speed of the mobile unit; and
   a feed-forward control portion that sets a feed-forward control of the mobile unit in accordance with the curvature calculated by the curvature calculating portion,
   wherein the curvature calculating portion includes:
   a closest point setting portion that sets, on the target path, a point that is closest to the mobile unit;
   an adjacent point setting portion that sets, on the target path, an adjacent point before the closest point set by the closest point setting portion and an adjacent point after the closest point set by the closest point setting portion; and
   an arc setting portion that sets an arc that extends through the closest point set by the closest point setting portion and the adjacent points set by the adjacent point setting portion.

2. The trajectory tracking control system according to claim 1, wherein
the curvature calculating portion determines the curvature in accordance with a control cycle of the mobile unit.

3. The trajectory tracking control system according to claim 1, wherein the adjacent point setting portion determines a distance between the closest point and each of the adjacent points in accordance with a moving speed of the mobile unit.

4. The trajectory tracking control system according to claim 1, wherein
the adjacent point setting portion sets a distance between the closest point and each of the adjacent points in accordance with a moving speed and a control cycle of the mobile unit.

5. The trajectory tracking control system according to claim 1, wherein
the adjacent point setting portion determines a distance L between the closest point and each of the adjacent points in accordance with $V\Delta T$ where V is a moving speed of the mobile unit and $\Delta T$ is a control cycle of the mobile unit.

6. The trajectory tracking control system according to claim 1, wherein the feed-forward control portion stops the feed-forward control when at least one of the amount of a position error of the mobile unit with respect to the target path and the amount of an orientation error of the mobile unit with respect to the target path is larger than a predetermined amount.

7. The trajectory tracking control system according to claim 1, further comprising:
a feed-back control portion that executes a feed-back control so as to reduce at least one of a position error and an orientation error of the mobile unit with respect to the target path.

8. The trajectory tracking control system according to claim 7, wherein
only the feed-back control is executed when the feed-forward control is stopped.

9. The trajectory tracking control system according to claim 1, wherein the mobile unit is a robot.

10. A trajectory tracking control method for controlling a mobile unit to track a target path described by free-form curves, comprising:
calculating, via a curvature calculating portion of a trajectory control system, an arc approximating to the target path including calculating a curvature of the arc in accordance with a moving speed of the mobile unit; and
setting a control of the mobile unit in accordance with the calculated curvature,
wherein the calculation of the curvature includes:
setting, on the target path, a point that is closest to the mobile unit;
setting, on the target path, an adjacent point before the closest point and an adjacent point after the closest point; and
setting an arc that extends through the closest point and the adjacent points.

11. The trajectory tracking control method according to claim 10, wherein
the curvature is calculated in accordance with a control cycle of the mobile unit.

12. The trajectory tracking control method according to claim 10, wherein
a distance between the closest point and each of the adjacent points is determined in accordance with a moving speed of the mobile unit.

13. The trajectory tracking control method according to claim 10, wherein
a distance between the closest point and each of the adjacent points is determined in accordance with a moving speed and a control cycle of the mobile unit.

14. The trajectory tracking control method according to claim 10, wherein
a distance L between the closest point and each of the adjacent points is determined in accordance with $V\Delta T$ where V is a moving speed of the mobile unit and $\Delta T$ is a control cycle of the mobile unit.

15. The trajectory tracking control method according to claim 10, comprising:
setting a control of the mobile unit so as to reduce at least one of a position error and a orientation error of the mobile unit with respect to the target path.

16. The trajectory tracking control method according to claim 10, wherein
the control of the mobile unit that is set in accordance with the curvature is stopped when at least one of the amount of a position error of the mobile unit with respect to the target path and the amount of an orientation error of the mobile unit with respect to the target path is larger than a predetermined amount.

17. The trajectory tracking control method according to claim 10, wherein
the mobile unit is a robot.

18. A trajectory tracking control system for controlling a mobile unit to track a target path described by free-form curves, comprising:
a non-transitory computer readable memory containing instructions executable by a computer, wherein the computer readable memory includes: an instruction
an instruction for causing the computer to execute a step of setting a control of the mobile unit in accordance with the calculated curvature,
wherein the calculating the curvature of the arc includes:
setting, on the target path, a point that is closest to the mobile unit;
setting, on the target path, an adjacent point before the closest point and an adjacent point after the closest point; and
setting an arc that extends through the closest point and the adjacent points.

* * * * *

UNITED STATES PATENT AND TRADEMARK OFFICE
CERTIFICATE OF CORRECTION

PATENT NO. : 8,751,089 B2
APPLICATION NO. : 12/282998
DATED : June 10, 2014
INVENTOR(S) : Hidenori Yabushita et al.

It is certified that error appears in the above-identified patent and that said Letters Patent is hereby corrected as shown below:

On the Title Page, Item (73), in the "Assignee", "Toyota Jidosah Kabushki Kaisha" should read -- Toyota Jidosha Kabushiki Kaisha --.

Signed and Sealed this
Twenty-third Day of June, 2015

Michelle K. Lee
*Director of the United States Patent and Trademark Office*